Aug. 8, 1950          J. F. SPIELMAN          2,518,088
TURNBUCKLE WRENCH
Filed Feb. 9, 1948
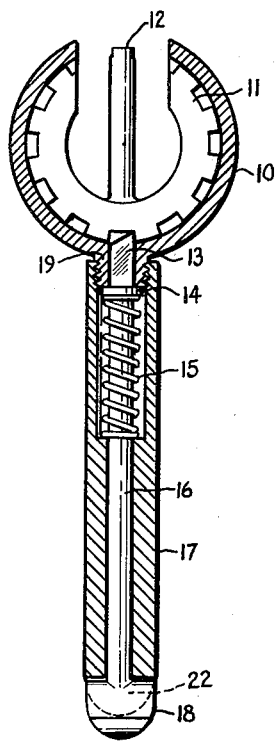
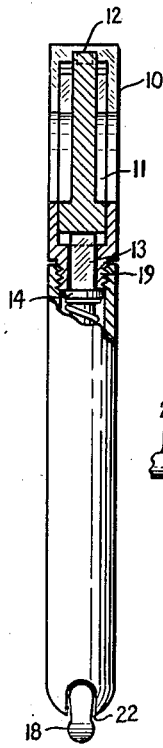
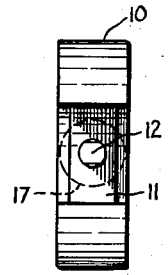
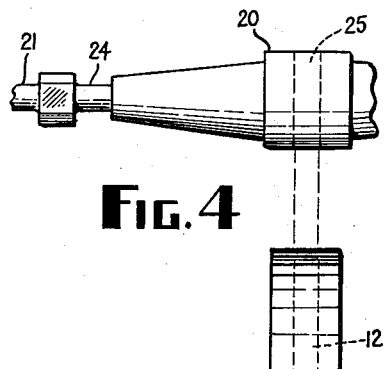
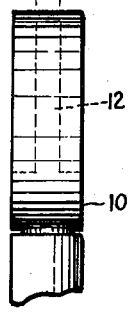
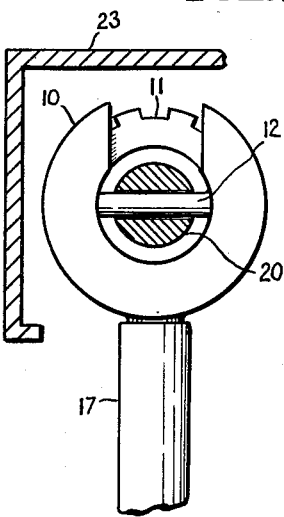
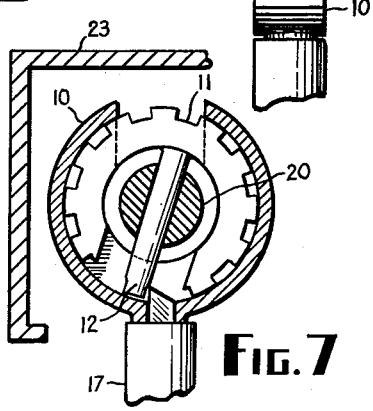
INVENTOR:
James F. Spielman Patented Aug. 8, 1950

2,518,088

UNITED STATES PATENT OFFICE 2,518,088

TURNBUCKLE WRENCH

James F. Spielman, Torrington, Conn.

Application February 9, 1948, Serial No. 7,131

2 Claims. (Cl. 81—90)

1

The invention relates primarily to improvements in devices intended to facilitate the adjustment of aircraft turnbuckles. Aircraft turnbuckles in common use afford only a hole in the turnbuckle barrel as means for engaging a tool with which to turn the barrel. Many metallic cables are used in airplanes; consequently many turnbuckles installed in these cables are located in nearly inaccessible places. No effective tool has heretofore been provided to facilitate aircraft turnbuckle adjustment.

One object of the invention is to provide an efficient, light-weight, compact tool for aircraft turnbuckle adjustment.

Another object is to provide a tool which will serve a wide range of turnbuckle sizes without adjustment of the tool.

Another object is to provide a tool for turnbuckle adjustment which is unlikely to accidentally disengage the turnbuckle.

Another object of the invention is to provide a tool which can easily be used to effect the adjustment of turnbuckles in inconvenient places.

One form of the invention is illustrated in the accompanying drawing, in which Figure 1 is a cross-sectional front view of the wrench; Figure 2 is a cross-sectional side view of the wrench; Figure 3 is a top view of the wrench; Figure 4 is a demonstrative view, showing how the wrench is applied to an aircraft turnbuckle; Figures 5, 6 and 7 are operational views, illustrating the effectiveness of the wrench in the event of an obstruction.

A radially toothed ring-segment 11 is rotatably encased in a ring-segment housing 10. An engaging pin 12, integral with the ring-segment 11, is diametrically disposed across the radial center of the ring-segment 11 to a point midway between the circumferential limits of the ring-segment 11 (Figs. 1 and 5). A handle 17 is screwed over a threaded extention 19, projecting from the base of the ring-segment housing 10. A pawl 13, rotatably mounted through the threaded extension 19, is integral and concentric both with a radial flange 14 and a reversing shaft 16 which extends longitudinally through the handle 17. A compression spring 15 is arranged around the reversing shaft 16 to urge the pawl 13 into engagement with the teeth of the ring-segment 11. The reversing shaft 16 is freely mounted through the handle 17 and integral with a reversing lever 18. Reversing lever 18 is seated in a conforming slot 22 in the lower end of the handle 17 by the pressure of the compression spring 15 upon the radial flange 14 on the reversing shaft 16.

2

By observation of Figure 4, it can be seen that a hole 25 in the turnbuckle barrel 20 is the means provided for engaging the tool. It is known that, to adjust the tension of a cable unit by a turnbuckle as depicted in Figure 4, the barrel 20 must be rotated about two oppositely screwing screw members whose shafts project from the ends of the barrel, these shafts each being arranged to contain an individual cable extremity. (Only one of these shafts is shown at 24. The portion 21 leads to one of the cables.)

It is apparent that the engaging pin 12 can easily be inserted into the hole 25 in the turnbuckle barrel 20 (Figs. 4 and 5), so that the turnbuckle barrel 20 assumes a position substantially perpendicular to and concentric with the face of the wrench (cross-section, Fig. 5). Figs. 5, 6 and 7 display the operation of the wrench in the event of an obstruction 23. When the handle 17 is moved to rotate the ring-segment housing 10 about the ring-segment 11 in a counter-clockwise direction (Figs. 1 and 5), the pawl 13 engages a tooth of the ring-segment 11. Thus the ring-segment and, consequently, the turnbuckle barrel 20 are rotated in conjunction with the ring-segment housing 10. Upon clockwise rotation of the ring-segment housing 10, by the handle 17 (Fig. 1), the tapered surface at the end of the pawl 13 contacts and slides successively over the teeth of the ring-segment 11.

To effect a reverse engagement of the pawl 13 with the teeth of the ring-segment 11, the reversing lever 18 is pulled with the fingers against the tension of the spring 15 and rotated to the extent of 180°.

It becomes evident on inspection of the drawings that a reciprocal movement of the handle 17 will continue to rotate the turnbuckle barrel 20 in a chosen direction. Also apparent is the fact that the projecting extremity of the engaging pin 12 will in turn serve as a tooth for engaging the pawl 13 during use (Fig. 7).

From the foregoing description of the invention it is evident that a turnbuckle wrench has been provided which is light in weight, compact, easy to manufacture, and can be used in cramped locations; and that the wrench offers a maximum of working efficiency by encircling the turnbuckle, while permitting uninterrupted operational progressions.

It is understood that the use of the invention is not limited to the adjustment of turnbuckles.

Numerous changes can be made in the shape and size of the wrench without departing from the spirit of the invention as set forth in the appended claims.

I claim:

1. In a wrench, the combination of: a ring segment of substantially over 180°, a plurality of uniform radial projections from the entire circumference of said ring segment, a pin extending from and diametrically disposed across said ring segment and medial to the circumferential limits of said ring segment, said pin being limited in length to the major path of travel of said radial projections, said ring segment being rotatably carried in a body which conforms with the circumferential limits of said ring segment whereby said radial projections have a common fixed path of travel, a shaftlike handle fixed to said body, a shaft extending longitudinally through said handle and having an inward pawl extremity, a lever on said shaft at the outward end of said handle, a compression spring in said handle adapted to urge said pawl on said shaft to intersect the path of travel of said radial projections and to urge said lever into a groove at the end of said handle, whereby said pawl slides over said radial projections in one direction of their path of travel and engages said radial projections in the opposite direction of their path of travel, whereby the rotation of said lever to the extent of 180° reverses direction of engagement of said pawl with said radial projections, whereby said pin functions in turn to engage said pawl, and whereby upon engagement of said pin through a diametric hole in a revoluble load member a reciprocal motion of said handle will rotate said load member in progressive steps.

2. In a wrench, a ring segment of substantially over 180°, a plurality of uniform radial projections from the entire circumference of said ring segment, a pin extending from and diametrically disposed across said ring segment and medial to the circumferential limits of said ring segment, said pin being limited in length to a line traced by the free ends of said radial projections, said ring segment being rotatably carried in a body which conforms in general shape with the said ring segment whereby said radial projections and the free end of said pin have a common fixed path of travel, and pawl means in said body for engaging said radial projections including said pin with said body in a chosen direction of rotation, whereby upon engagement of said pin through a diametric hole in a revoluble load member a manual reciprocal rotative movement of said body will rotate said load member in progressive steps.

JAMES F. SPIELMAN.

REFERENCES CITED

The following references are of record in the file of this patent:

UNITED STATES PATENTS

| Number | Name | Date |
|---|---|---|
| 759,824 | Murch | May 10, 1904 |
| 1,397,810 | Johnson | Nov. 22, 1921 |
| 1,475,834 | Kadow | Nov. 27, 1923 |